United States Patent [19]

Wensley

[11] 4,008,458
[45] Feb. 15, 1977

[54] REMOTE AUTOMATIC READING SYSTEM

[75] Inventor: Gerald J. Wensley, Omaha, Nebr.

[73] Assignee: Darco Telemetering Systems, Omaha, Nebr.

[22] Filed: Sept. 5, 1975

[21] Appl. No.: 610,895

[52] U.S. Cl. .............................. 340/151; 340/150
[51] Int. Cl.[2] ........................................ H04Q 9/00
[58] Field of Search .......... 340/151, 152, 183, 150; 179/2 D, 2 P

[56] References Cited
UNITED STATES PATENTS

| 3,786,423 | 1/1974 | Martell | 340/151 |
| 3,820,074 | 6/1974 | Toman | 340/151 |
| 3,829,835 | 8/1974 | Stewart | 340/151 |

Primary Examiner—Harold I. Pitts
Attorney, Agent, or Firm—Clarence A. O'Brien; Harvey B. Jacobson

[57] ABSTRACT

Utility or industrial meters having rotating elements are monitored by an automatic reading unit through which digital input data is stored and read out in response to interrogation by a coded polling signal transmitted to the unit through telephone lines. Readout occurs during a transmit cycle and includes the serial transfer of stored digital data to digital synthesizers through which data is converted to a sinusoidal analog signal transmitted by the telephone lines for decoding at a data collecting station. By the addition of optional components, time of day metering, demand metering and the exercise of control functions at a remote site may be effected.

13 Claims, 8 Drawing Figures

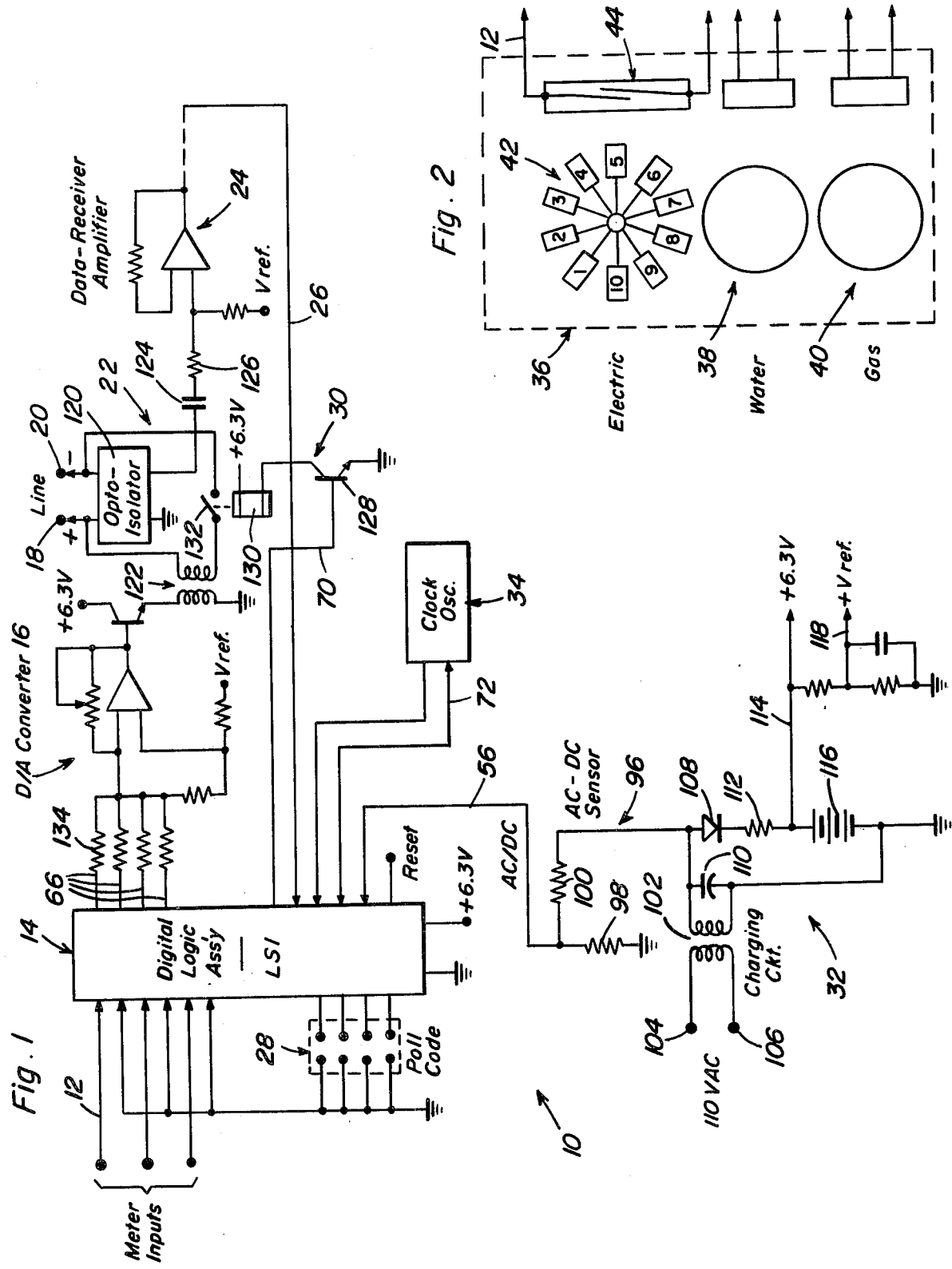

REMOTE AUTOMATIC READING SYSTEM

BACKGROUND OF THE INVENTION

This invention relates to the automatic reading of utility and industrial meters such as gas, water and electric meters.

Many systems have been devised for automatically reading utility meters including the storing of input data obtained from the meters, and the readout of such data in response to interrogation from a remote data collecting station through telephone lines. Such a system is disclosed in U.S. Pat. No. 3,376,389 to Fair, owned by the assignee of the present application. Other prior U.S. patents more or less related to the subject matter of the present invention in regard to general objectives include U.S. Pat. Nos. 3,553,376, 3,588,357, 3,390,234, 3,747,068, 3,786,423, 3,800,091, 3,820,073, 3,842,206 and 3,868,640.

Prior automatic utility meter reading systems of the aforementioned type have not been generally adopted because of economic factors. Such factors include the cost of the system itself, the required modification of existing utility meters, the generation of signal carriers and dependence on telephone company equipment. It is therefore an immportant object of the present invention to provide an automatic meter reading unit of relatively low cost, having a complete receive/transmit capability to avoid dependence on equipment of the telephone utility and requiring relatively minor modification of the meters to be read.

In its most general application, the automatic reading unit of the present invention is operative to monitor a sequence of events represented by switch closures. Digital inputs are received in a digital circuit assembly in which counter logic stores data bits corresponding to said switch closures as well as an identification code bit and a power data bit representing the state of the power source through which the unit is energized. Operating power for the unit is obtained independently of the signal transmission lines to which it is connected. An analog polling signal when detected across the signal transmission lines, is demodulated into a digital poll code for interrogation purposes by initiating a transmit cycle during which the stored bits in the counter logic are serially readout and transformed by digital synthesizers into a step simulated sinusoidal waveform. This simulated waveform is converted into an analog data signal fed through the signal transmission lines to a data collecting station.

The automatic meter reading unit of the present invention is associated with a system wherein a plurality of utility meters at each meter reading station are modified by the mounting of magnetic elements on the dials of the meter for causing switch closures or reed switches during each revolution of each unit dial. The switch closures are sensed by electronic decade counters that are stepped to maintain or store digital input data corresponding to the meter readings represented by the switch closures. The automatic meter reading unit is powered by the usually available AC power source with a battery backup to maintain the counts and remote unit operation during a power outage. Information on the state of the power source is represented by a data bit in the transmitted code signal containing the data bits representing the meter reading inputs to the unit. Interrogation of the meter reading unit is accomplished by dispatch of coded polling signals to the meter reading unit from a central data collection station located, for example, at a utility company. Each meter reading station may be automatically dialed and upon sensing of the coded polling signal, the automatic meter reading unit responds by transmitting the aforementioned input data bits as well as the power bit and an identification code bit. A high impedance device such as an opto-isolator is bridged across the telephone lines at the meter reading station, to isolate the unit from the telephone line during its interrogation receive mode. In response to receipt of the proper poll code, the lines are seized at the meter reading station by the connection of a load thereacross through a reed relay circuit. The unit is then placed in its transmit mode with the bits of information stored in the digital counter logic serially readout and frequency shift modulated. The readout of the meter reading unit is synthesized into a step simulated sinusoidal waveform and converted into an analog signal conforming to requirements of the telephone communication system in regard to harmonic content and signal strength of the transmitted signal. Further, by producing a zero output at the beginning of each transmit cycle for a period of short duration data may be transmitted without generation of any signal carrier. The digital logic components associated with the automatic meter reading unit are integrated into a single large scale integrated circuit chip. This digital circuit assembly includes parity checking components for detecting poll code transmission signal error, which would result in an automatic reset. Various options are available to functionally enlarge the system with which the automatic reading unit is associated by relatively simple connection of additional components thereto including facilities to monitor time-of-day usage of the various utilities being automatically read, means for monitoring the meter reading inputs during spaced intervals of time for demand reading purposes and means for providing a remote control function at the meter reading station in association with the interrogation of the automatic meter reading unit. The foregoing options are significant in that they provide for low cost load management.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an electrical circuit diagram illustrating an automatic meter reading unit in accordance with the present invention.

FIG. 2 is a simplified schematic diagram of the incremental meter reading or event detecting sensor.

DETAILED DESCRIPTION OF THE PREFERRRED EMBODIMENTS

Figure 3:
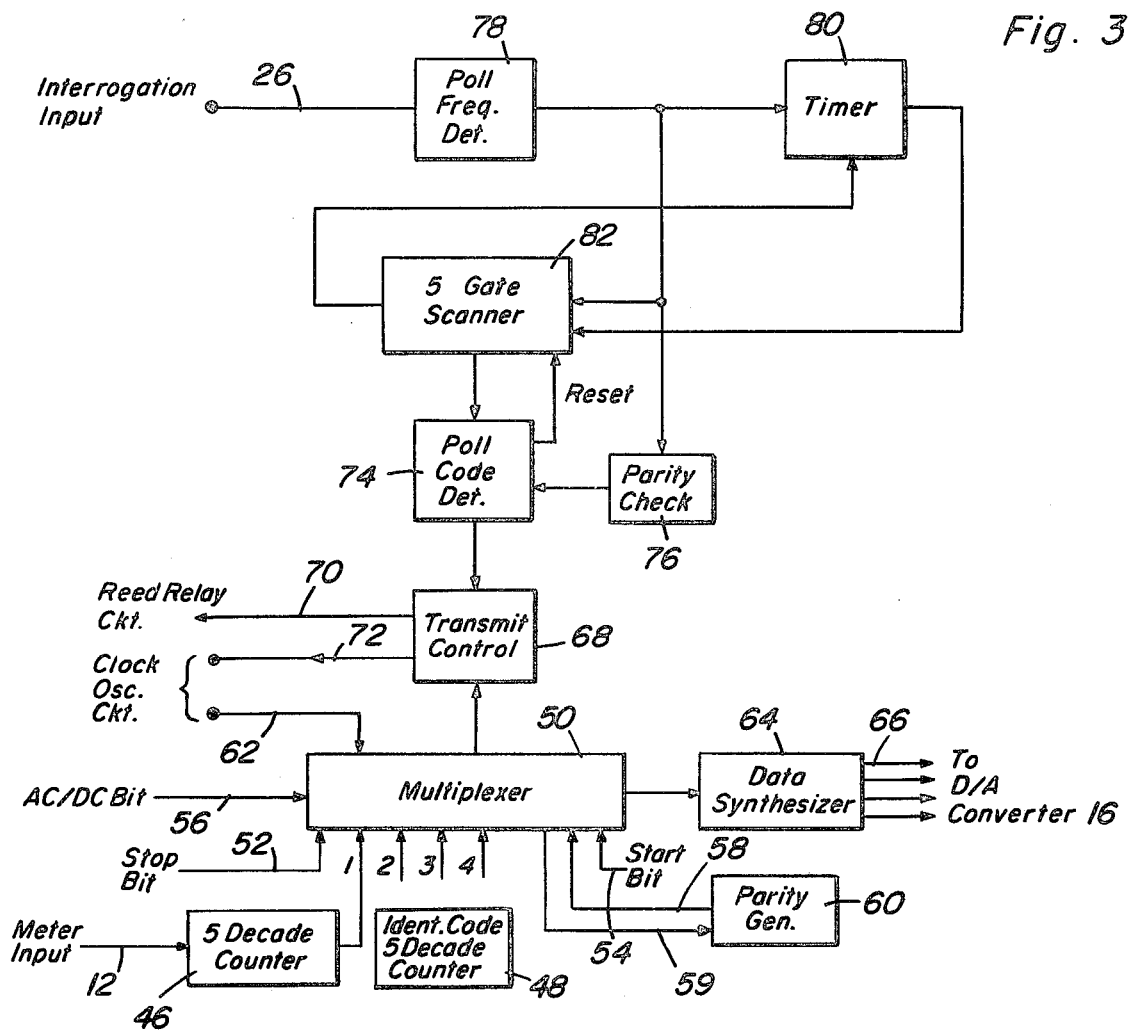
FIG. 3 is a block circuit diagram of the digital logic assembly embodied in a single LS1 integrated circuit associated with the automatic meter reading unit diagrammed in FIG. 1.

Referring now to the drawings in detail, FIG. 1 illustrates an automatic meter reading unit generally referred to by reference numeral 10 adapted to be installed at a meter reading station for the purpose of automatically reading a time spaced sequence of events such as displacement of a plurality of utility meters by incremental amounts. Digital data inputs are supplied to the unit 10 through input lines 12 that are connected to an assembly of digital logic components 14 adapted to be formed as a single large scale integrated circuit chip. As will be explained in further detail hereafter, the input data to the digital logic assembly 14 is stored and when interrogated by a predetermined poll code signal, the stored information is read out in the form of a synthesized, step simulated sinusoidal waveform to a digital-to-analog converter 16. The analog signal output from the converter is fed to the tip and ring terminals 18 and 20 of commercial telephone lines through a coupling assembly 22 through which the automatic meter reading unit is normally conditioned in a receive mode. In the receive mode, interrogation of the automatic reading unit is effected by reception of a predetermined polling signal that is transmitted from the telephone lines through one or more stages of a linear amplifier 24 connected by an interrogation input line 26 to the digital logic assembly 14. The digital logic assembly will thereby respond to a predetermined poll code and undergo a data transmission cycle during which the stored input data is readout as aforementioned. The particular poll code to which the digital logic assembly responds is established through external strapping 28. When the preselected poll code is decoded within the digital logic assembly, the telephone lines are seized through a load applying, reed relay circuit 30 enabling transmission of the data content of the digital logic assembly in a transmit mode by means of a frequency shift method. The data transmitted is preceded by a short interval of time such as 50 milliseconds, during which the telephone lines are conditioned to allow for error free transmission. The data includes the input data received through input lines 12, an identification code, a stop bit, a transmission error parity bit and a state of power bit. Power for operating the digital logic assembly and the other components of the automatic meter reading unit is obtained from a power supply generally referred to by reference numeral 32 which is independent of the power across the telephone lines. The timing reference signal for operation of the digital logic assembly in its transmit mode, is derived from a clock oscillator component 34.

The digital data inputs supplied to the digital logic assembly 14 through the input lines 12 are derived from a plurality of utility meters such as an electric meter 36, a water meter 38 and a gas meter 40 diagrammed in FIG. 2. Each meter is modified in accordance with the present invention by removing the units dial indicator and replacing it with a 10 pole, magnetic rotor 42. A magnetically responsive reed switch 44 is positioned adjacent to each magnetic rotor to produce 10 switch closure for each revolution of a units dial. An exact incremental count is thereby provided for each utility meter. Other event detecting sensors may, of course, be utilized in order to provide a switch closure in response to the occurrence of each event. Each switch closure of the reed switches 44 in the illustrated embodiment, produces a digital input applied through one of the data input lines 12 to the digital logic assembly 14.

The digital logic assembly 14 is constructed in the form of a single large scale integrated circuit chip embodying a plurality of digital logic components as diagrammed in FIG. 3. The data input lines 12 from the three utility meters illustrated, for example, in FIG. 2 are respectively connected to three decade counters 46, one of which is diagrammed in FIG. 3. These decade counters function to accumulate the count of the input closures from the meters being monitored. A fourth decade counter 48 is provided to store a preselected identification code corresponding to the meter reading station at which the automatic meter reading unit is located. Each of the counters 46 and 48 will have four outputs in a 1-2-4-8 configuration. Thus, the decade counter components constitute four groups of five counters in tandem. External means may be provided to enable strapping of any or all groups together to form either a twenty decade group without use of an identification code or a 15 digit counter with use of an identification code. The outputs of the counters are connected to a multiplexer logic component 50 to which stop-and-start bits are fed through lines 52 and 54. An AC/DC power bit is also fed to the multiplexer 50 through line 56 representing the state of the power source 32 aforementioned.

Figure 8:
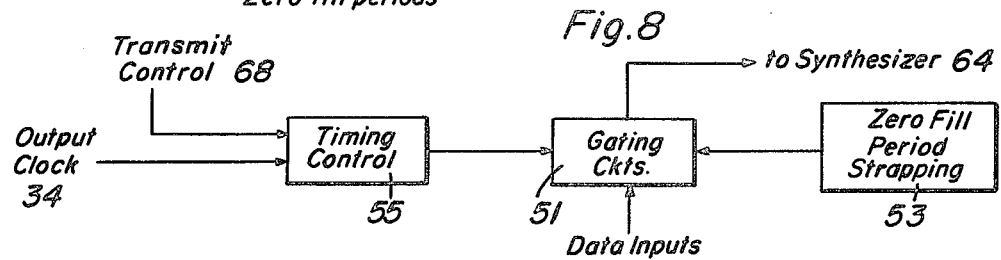
FIG. 8 is a functional block diagram associated with the multiplexer depicted in FIG. 3.

During a transmit cycle, the multiplexer logic gates the contents of a first of the decade counters through data synthesizer 64 connected to the digital to analog converter 16 through outputs 66 for producing a step simulated sine wave. Transmission of the parity bit through line 58 from a parity generator 60 is then processed before gating of the contents of the next decade counter begins. This sequence is repeated until the contents of all four decade counters 46 and 48 have been transmitted. The start and stop bits and AC/DC bits will be loaded at each cycle. The parity generator 60 is toggled each time a logic 1 bit is clocked from the miltiplexer 50 through line 59. The state of the parity generator is sensed to verify an odd or even number of data bits. The gating associated with the multiplexer component 50 provides fo simultaneous output from a group of the decade counters selected by a timer 55 in the multiplexer as shown in FIG. 8. Each count complete signal will reset the multiplexer timer to the initial count until all decade counters have been scanned. By means of the synthesizer 64 the data input from the multiplexer 50 to the D/A converter 16 is step simulated into sinusoidal waveform.

The multiplexer component 50 is connected to a transmit control component 68 that is reset at the end of each transmission cycle. The transmit control component 68 provides a current source during the transmit mode of the multiplexer component 50 to energize the line load control relay circuit 30 through control line 70.

The transmit control component 68 is set by a signal received from a poll code detector component 74 and provides the capability of allowing 16 different codes to be decoded in accordance with the external strapping 28 as hereinbefore indicated with respect to FIG. 1. An odd parity check circuit 76 is provided and is toggled each time 1 logic is clocked. The state of the circuit 76 at the end of a poll cycle will be sensed to verify an odd or even number of data bits received.

The incoming poll data signal in the interrogation line 26, is demodulated by a poll digital frequency detector 78 from which a detected signal if fed to the input timer 80, a five gate scanner 82 and the parity check circuit 76. The transmit start logic 68 is enabled upon the detection of a strapped poll code start bit. The first clock pulse of clock 34 occurs half way between the pulse width of the start bit. Detection of the start bit and the succeeding timing pulses will cause the poll data signal to be serially gated through the scanner 82. The scanner is reset by a signal from the poll code detector 74 after the poll signal is decoded. Detection of a parity error will also cause reset of the gate scanner and prevent enabling of a transmission cycle, through the transmit control 68.

Figure 4:
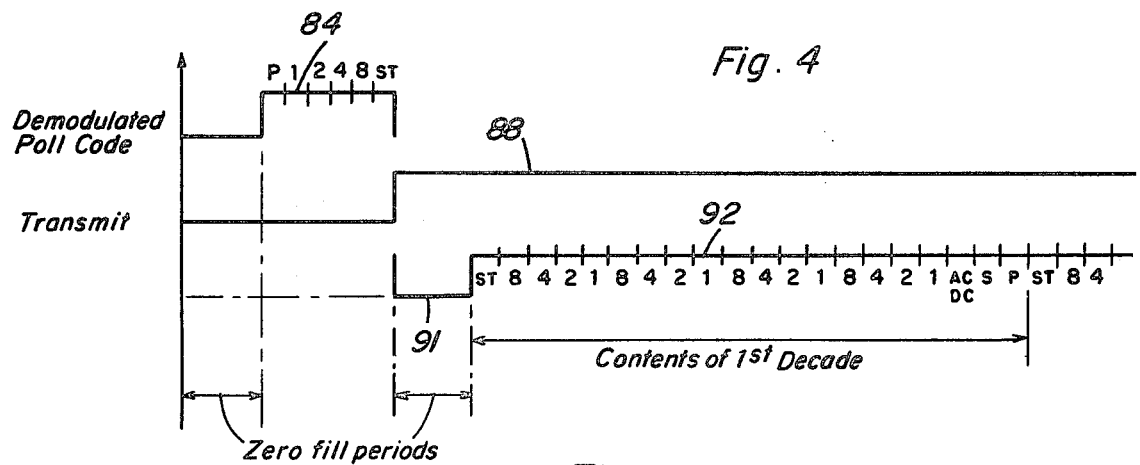
FIG. 4 is a graphical illustration of the timing references established by various waveforms associated with some of the components in the automatic meter reading unit.

In summary, the digital logic assembly 14 embodies the decade counter logic through which the input data is accumulated from the utility meters. During a transmit cycle, the contents of the decade counters 46 and 48 are multiplexed and serially gated into the data synthesizer 64 to produce the inputs to the D/A converter 16 resulting in a step simulated sinusoidal waveform representing the binary contents of the decade counters. Logic is also provided to detect and decode a coded frequency shift key signal supplied to the digital logic assembly through the interrogation line 26, the coded poll signal consisting of a start bit, four data bits and a parity bit. Upon detection of the correct poll code, the transmit control component 68 is enabled and a transmit cycle in the multiplexer component 50 begins. The timing for the foregoing operations of the digital logic assembly is graphically illustrated in FIG. 4. As shown in FIG. 4, the demodulated poll code signal 84 that initiates the transmit mode, is terminated by the digital frequency detector 78 resulting in the switching of the transmit control logic 58 from a low to a high state as indicated by the curve 88. This initiates timing pulses from the timer 80 producing a gating enable in the multiplexer component 50. The multiplexer 50 as functionally shown in FIG. 8 has gates 51 that are strapped by strapping 53 to produce zero data bits for a 50 millisecond period at the beginning of a transmit cycle as shown by curve 91 in FIG. 4. The synthesizer logic 64 is then gated with data bits beginning with the data readout from the first of the decade counters as shown by 92 in FIG. 4.

As hereinbefore indicated, the data bits processed through the multiplexer component 50 include in addition to the input data bits from the meters, and the start and stop bits, the AC/DC power bit fed to the multiplexer component through lines 56 from an AC/DC sensor 96 as shown in FIG. 1 which includes the grounded resistor 98 and the signal conducting resistor 100. The resistor 100 is connected to the input of transformer 102 in order to sense the condition of the AC power source connected to the primary of the transformer through the power terminals 104 and 106. An operating DC voltage is supplied to the components of the unit from the transformer 102 after the AC output thereof is rectified by diode 108 and filtered by capacitor 110. A voltage reducing resistor 112 conducts the rectified current to the operating voltage supply line 114 which is also connected to an auxiliary power supply in the form of DC battery 116. The rectified voltage in line 114 is operative to maintain the battery 116 charged. A reference voltage is also supplied to the unit through line 118.

With continued reference to FIG. 1, it will be noted that the telephone lines are normally coupled to the digital logic assembly 14 through the interrogation line 26 in its data receive mode and toward that end, the coupling component 22 includes an opto-isolator 120 connected to the secondary of a 900 ohm matching transformer 122. In the receive mode, the secondary transformer circuit is open and any poll code signal is transmitted from the output of the opto-isolator 120 to coupling capacitor 124 and resistor 126 to the linear amplifier 24. This amplifier has a high impedance input and limited band pass characteristic so as to receive the proper data frequency. Interrogation of the unit 10 may be accomplished by dialing the telephone number of the meter reading station either manually or automatically. After the communication connection is established to the meter reading station, and an appropriate poll code signal transmitted, the aforementioned minimum 50 millisecond 0 fill period precedes the start bit in the decoded poll code signal which produces a switching signal in line 70 turning on transistor 128 associated with the load control relay circuit 30. When switched on, the transistor 128 energizes the reed relay 130 to close its relay switch 132 thereby completing the secondary winding circuit of the transformer 122 across the telephone lines. The transmit cycle then begins as aforementioned. Upon termination of the transmit cycle, the relay 130 is deenergized to drop the meter reading unit from the line so that it may revert back to its receive mode.

During the transmit cycle, the readout from the digital logic assembly 14 is conducted through the output lines 66 and resistors 134 to the digital-to-analog converter 16 by means of which the data output signal in the form of an analog voltage is applied to the primary of transformer 122. This signal is applied to the telephone lines for transmission to a data collection station.

Figure 5:
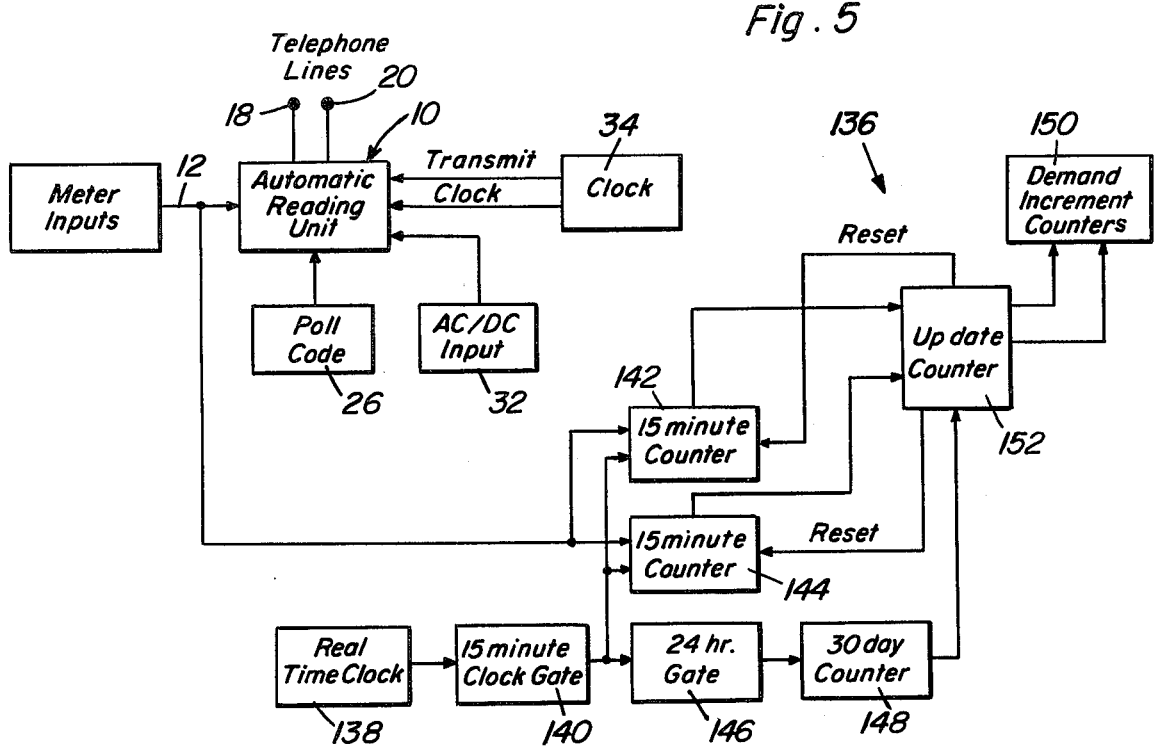
FIG. 5 is a block circuit diagram of a demand meter reading facility associated with the basic automatic meter reading system of the present invention.

FIG. 5 illustrates the basic automatic reading unit 10 of the present invention associated with meter inputs, output clock 34, poll code strapping 28 and AC-DC bit input 96 as hereinbefore described in connection with FIG. 1. The meter input lines 12 as shown in FIG. 5 are however also connected in parallel with a demand meter monitoring system generally referred to by reference numeral 136 by means of which the utility meters may be monitored in fifteen minute intervals. The system utilizes a real time clock 138, the output of which is gated by gate 140 to provide a comparison output pulse every fifteen minutes. The output pulse gate gage 140 is applied to two counters 142 and 144 and a 24 hour gate 146. Initially, the first counter 142 will count in parallel with a 30 day counter 148 that is pulsed through gate 146. The output of counter 142 will then be transferred to a demand increment counter 150 through an up-date counter 152. The first counter 142 is enabled for this purpose for an initial 15 minutes period after which the second counter 144 is enabled for the next 15 minutes. After the second 15 minute period is completed, a comparison of both counters will be made in the up-date counter 152 and if the second counter 144 has a greater count, the demand increment counter 150 will be stepped to reflect the increase of the second 15 minute period while the first 15 minute counter 142 is reset. If the output of the second counter 144 is lower or equal to that of the first counter, the count in the first counter 142 is stored and the second counter 144 is reset prior to counting during the next 15 minute period. This method will be used so that the demand increment counters 150 will always be updated on any 15 minute increase in usage.

The 30 day counter 148 allows interrogation of the counter contents followed by read out through the demand increment counters 150 at any time during a 30 day period. If interrogation occurs prior to the end of a 30 day period, the active demand increment counters 150 will not be reset. If the interrogation occurs on or after the 30 day period, the active increment counters 150 will be reset after the contents are transmitted.

Figure 6:
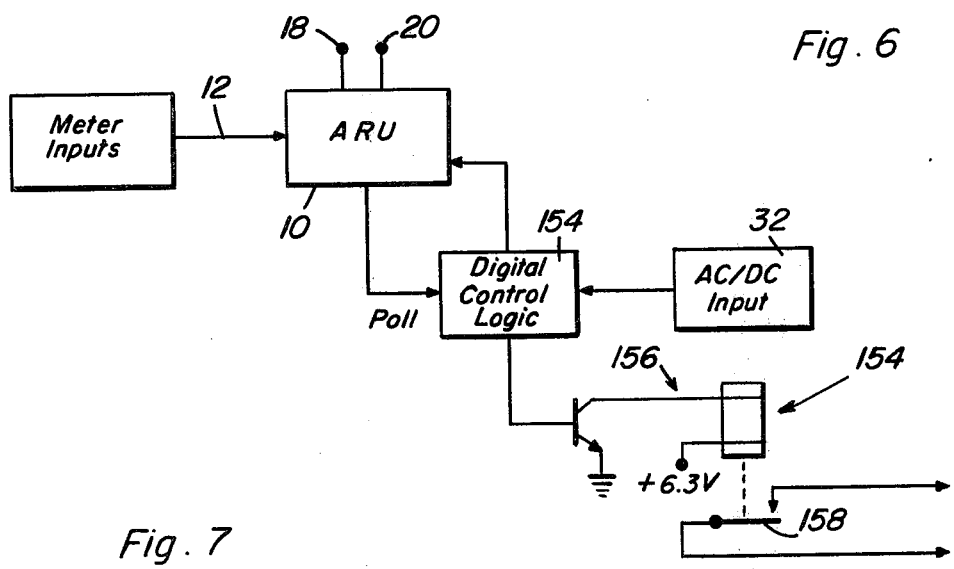
FIG. 6 is a block circuit diagram illustrating an optional remote control facility associated with the automatic meter reading system.

FIG. 6 illustrates an additional installation arrangement for the automatic reading unit 10 wherein a second digital control logic assembly 154 is interconnected with the automatic meter reading unit 10 and energized therewith from the power source 32. A second load controlling relay circuit 156 is connected to the digital control logic assembly 154. This relay circuit 156 operates a utilization circuit through relay switch 158. The digital control logic 154 responds to a different poll code signal than the standard automatic reading unit 10. Accordingly, upon receipt of the control poll code, the digital control logic 154 enters its transmit mode to energize the relay circuit 154, in order to perform some function through the utilization circuit.

Figure 7:
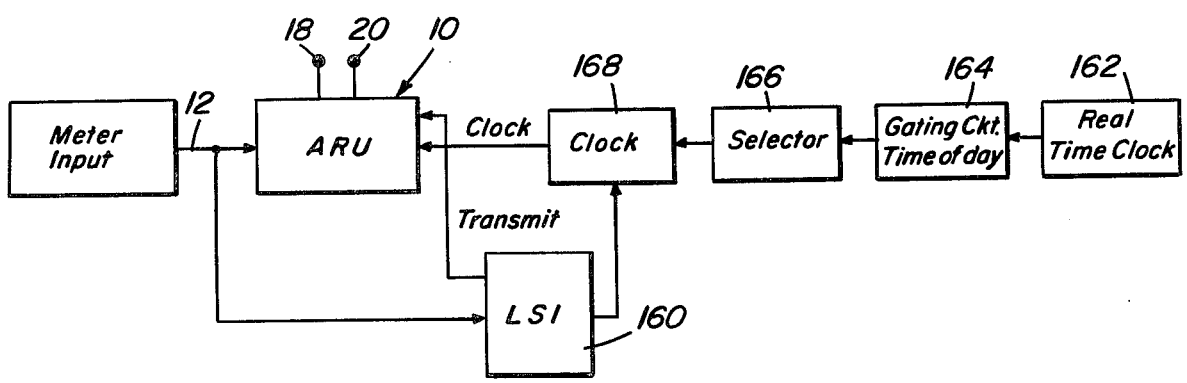
FIG. 7 is a block circuit illustrating an optional facility associated with the automatic meter reading system for determining the time-of-day usage of utilities being monitored by the automatic meter reading system.

FIG. 7 illustrates yet another installation for the automatic meter reading unit 10 wherein the inputs from the meters are connected to parallel with an integrated control circuit 160 which operates as a time-of-day register. The output of a real time clock 162 is gated by a time-of-day, gating circuit 164. Different gating times may be selected through a selecter component 166 connected to the outputs of the gating circuit 164 in order to allow the control circuit 160 to be activated at different selectable periods of the day under control of the electronic clock 168. Both the automatic meter reading unit 10 and the control circuit 116 are interrogated through the telephone lines by the same poll code signal placing both the unit 10 and control circuit 160 in the transmit mode. The readout from the control circuit 160 is however delayed by stopping of the transmit clock 168 until the unit 10 has completed its transmission cycle. Upon completion, the control circuit 160 will transmit the data input content and drop the telephone line. The identification code data bit associated with the control circuit 160 will be identical to that of the unit 10 except for a significant digit which will indicate that the transmission is the time-of-day reading accumulation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a sensor at a data reading station detecting a sequence of events to produce corresponding switch closures, and a telephone communication system having message lines, through which polling signals are transmitted to said data reading station for interrogation thereof and data signals from the data reading station are transmitted to a data collecting station, an automatic reading unit comprising digital logic means connected to the sensor for storing digital input data in response to said switch closures interrogation input means coupling the message lines to the digital logic means for transforming said stored digital input data into a frequency shifted, step simulated sinusoidal waveform in response to a coded analog polling signal, digital-to-analog converter means coupling said digital logic means to the message lines for converting said transformed digital input data into an analog data signal transmitted by the message lines to the data collecting station, a source of AC power connected to the automatic reading unit for operation thereof independently of the telephone communication system and an auxiliary source of DC power for operating the automatic reading unit in response to loss of power from the AC power source, said digital input data having a format including data bits corresponding to said switch closures and a power sensing bit representing the state of the AC power source.

2. The combination of claim 1 wherein said data format further includes an identification code bit.

3. The combination of claim 2 wherein said digital logic means comprises a plurality of binary counters within which the data bits and the identification code bit are stored, data synthesizer means through which said bits are transformed into the frequency shifted, step simulated sinusoidal waveform, multiplexer means connected to the counters for serial transfer of the stored bits to the synthesizer means during a transmit mode, and demodulating means connected to interrogation input means for initiating a transmitting cycle of the multiplexer means in the transmit mode in response to said coded polling signal.

4. The combination of claim 3 including load control means responsive to termination of said transmitting cycle for switching the multiplexer means to a receive mode, and transmit control means connected to the demodulating means and the load means for enabling operation of the multiplexer means in said transmit mode.

5. The combination of claim 8 wherein said digital input data has a format including data bits corresponding to switch closures and a power sensing bit representing the state of the AC power source.

6. The combination of claim 1 wherein said digital logic means comprises a plurality of binary counters connected to the sensor for receiving the digital input data therefrom and storing the same in the form of data bits, data synthesizer means through which said bits are transformed into the frequency shifted, step simulated sinusoidal waveform, multiplexer means connected to the counters for serial transfer of the stored bits and the power sensing bit to the synthesizer means during a transmit mode, and demodulating means connected to interrogation input means for initiating a transmitting cycle of the multiplexer means in the transmit mode in response to said coded polling signal.

7. The combination of claim 1 including digital control logic connected to the digital logic means and responsive to another coded polling signal for loading the message lines, and utilization circuit means connected to the digital control logic at the data reading station for operation in response to said loading of the message lines.

8. The combination of claim 7 including a source of AC power connected to the automatic reading unit for operation thereof independently of the signal transmitting means and an auxiliary source of DC power for operating the automatic reading unit in response to loss of power from the AC power source.

9. The combination of claim 1 including a real time clock, a time of day register connected to the clock and the sensor and means coupling the register to the digital logic means for simultaneous readout of the digital input data accumulated and a corresponding identified period of time in response to said coded polling signal.

10. The combination of claim 1 including demand reading means connected to the sensor in parallel with the digital logic means for monitoring said events during spaced intervals of time.

11. In combination with a source of digital input data and signal transmitting means through which an analog polling signal is transmitted, an automatic reading unit interconnected between said source and the signal transmitting means, comprising digital counter logic connected to the source for storing the input data, demodulating means connected to the signal transmitting means for transforming said analog polling signal into a digital poll code, data processing means connected to said digital counter logic for serial readout of the stored input data during a transmitting cycle, transmit control means connected to the interrogation means for initiating said transmitting cycle in response to said digital poll code and converter means connected to the data processing means for converting the readout of the stored input data into an analog data signal fed to the signal transmitting means, said data processing means including means for producing a zero output at the beginning of the transmitting cycle for a zero fill period before said readout of the stored input data.

12. The combination of claim 6 including means for producing a zero output at the beginning of the transmitting cycle for a zero fill period before said readout of the stored input data.

13. The combination of claim 3 including means for producing a zero output at the beginning of the transmitting cycle for a zero fill period before said readout of the stored input data.

* * * * *